United States Patent [19]

Dubreux et al.

[11] Patent Number: 4,913,834
[45] Date of Patent: Apr. 3, 1990

[54] STORAGE STABLE FLUID DETERGENT FORMULATIONS WITH BLEACHING ACTION

[75] Inventors: Bernard Dubreux, Francheville Le Bas; Jean-Pierre Schirmann, Oullins, both of France

[73] Assignee: Atochem, Paris, France

[21] Appl. No.: 652,291

[22] Filed: Sep. 18, 1984

[30] Foreign Application Priority Data

Sep. 20, 1983 [FR] France ................................. 8314913

[51] Int. Cl.$^4$ .......................... C11D 7/54; D06L 3/02
[52] U.S. Cl. ..................................... 252/104; 252/95; 252/139; 252/186.29; 252/186.43; 8/111
[58] Field of Search ................. 8/111; 252/96, 97, 99, 252/104, 174.21, 186.29, 186.43, 540, DIG. 14, 139

[56]  References Cited

U.S. PATENT DOCUMENTS 3,925,008 12/1975 Makino et al. ...................... 252/102
4,316,812 2/1982 Hancock et al. ...................... 252/99

FOREIGN PATENT DOCUMENTS 1262982 3/1968 Fed. Rep. of Germany .
2145400 7/1971 France .
2145644 7/1972 France .

Primary Examiner—Paul Lieberman
Assistant Examiner—John F. McNally
Attorney, Agent, or Firm—Sigalos, Levine & Montgomery

[57]  ABSTRACT

Storage stable anhydrous fluid detergent formulation with bleaching action for textile comprising, in the anhydrous state, hydrogen peroxide and the process for the preparation of these formulations.

4 Claims, No Drawings

STORAGE STABLE FLUID DETERGENT FORMULATIONS WITH BLEACHING ACTION

BACKGROUND OF THE INVENTION

The present invention concerns fluid detergent formulations with bleaching action, stable under storage, suitable for textile bleaching in an alkaline bath. More particularly, the invention concerns such formulations presenting themselves in the form of a suspension of a solid phase in a liquid phase comprising surfactants, hydrogen peroxide, and possibly one or several solvents.

The use of hydrogen peroxide as a textile bleaching agent has long been known. Hydrogen peroxide; not very stable in alkaline media, liberates its oxygen in order to produce a bleaching action. But this property is also a drawback if one desires a complete detergent formulation with bleaching action in an alkaline bath, since then the active oxygen is not stable under storage, principally in fluid formulations. In order to eliminate this drawback, for a long time combinations of hydrogen peroxide with different compounds capable of liberating the latter at the moment of washing have been proposed and utilized. The persalts and peroxyhydrates such as, for instance, sodium perborate, sodium percarbonate, urea peroxyhydrate, and the like respond to this objective and can be included in different solid or liquid formulations with an improvement of the stability of the active oxygen. However, these persalts and peroxyhydrates make it necessary to introduce into the formula, in addition to the hydrogen peroxide, a support of high molecular weight and most often without detergent action.

SUMMARY OF THE INVENTION

In a surprising manner, it has been discovered that hydrogen peroxide can be included in fluid formulations suitable for textile bleaching in an alkaline bath containing neither persalts nor peroxyhydrates, on the condition that the hydrogen peroxide itself and the other ingredients are in the anhydrous state.

Briefly, the present invention comprises storage stable anhydrous fluid detergent formulations with bleaching action for textiles comprising a liquid phase and a solid phase; the liquid phase comprising anhydrous hydrogen peroxide and to the process of making such formulations as hereinafter set forth.

DETAILED DESCRIPTION

In order to achieve the formulations in conformity with the present invention, the liquid and solid phases can be constituted by mixing the hydrogen peroxide and the other ingredients in any proportions and in no matter what order.

The hydrogen peroxide can either be used directly in the anhydrous form or, preferably, in the form of a anhydrous solution in an organic solvent selected preferably from among primary, secondary, or tertiary alcohols and polyethers derivatives of ethylene glycol or of propylene glycol; solvents which then constitute or which can constitute in themselves the ingredients of the formulations according to the invention.

Suitable, in general, as ingredients present in the liquid phase of the formulation according to the invention are all those which, compatible with a detergent formula, are liquid or liquefied in the presence of the other constituents of the liquid phase. The proportion of liquid phase can easily be determined by one skilled in this art as a function of the desired fluidity. In order to implement the formulations in conformity with the present invention, in general one can use all of the ingredients which are suitable in order to implement a formula known to be useful by one skilled in this art, to the extent that these ingredients are introduced in the anhydrous state and mixed in the absence of water. Excluded from the invention, thus, are all ingredients which cannot be obtained in anhydrous form without irreversible alteration (deterioration), as well as the mixtures of ingredients leading to the formation of water at temperatures below about 70° C.

In the same way, the conditions necessary for keeping in suspension the different solid ingredients in the liquid phase will easily be determined by one skilled in this art as a function of the viscosity of the liquid phase, the density of the solid, and its granulometry. However, the keeping in suspension of the solid phase ensuring the homogeneity of the mixture is not an imperative condition and, without thereby leaving the scope of the invention, one can carry out non-homogeneous mixtures which the user in the end must naturally agitate before use.

The formulations of the present invention are as stable as those containing the same quantity of hydrogen peroxide in the form of a persalt, for instance sodium percarbonate, and compared to the latter they present the advantage of not comprising useless filler or carrier, such as the sodium carbonate in sodium percarbonate.

The invention will be further described in connection with the examples which follow that are set forth for purposes of illustration only.

EXAMPLES 1 TO 4

Products used:
  A. Liquid Phase
    1. Surfactants
      $S_1$: condensation product tall oil—1 part; ethylene oxide—1.6 parts.
      $S_2$: dodecylphenol condensed with 10 moles of ethylene oxide.
    2. Solvents—hydrogen peroxide: prepared by azeotropic elimination of the water from the solvent and from 70% hydrogen peroxide.
      $S_3$: normal primary butanol—85 parts; hydrogen peroxide—15 parts.
      $S_4$: secondary butanol—90 parts; hydrogen peroxide 10 parts.
  B. Solid Phase
    1. Sodium tripolyphosphate TPP
    2. Sodium laurate SL
    3. Sodium sulfate SS

| Formulations | A (Ex. 1) | B (Ex. 2) | C (Ex. 3) | D (Ex. 4) |
| --- | --- | --- | --- | --- |
| $S_1$ | 12 | 0 | 11 | 0 |
| $S_2$ | 0 | 12 | 0 | 11 |
| $S_3$ | 28 | 28 | 0 | 0 |
| $S_4$ | 0 | 0 | 30 | 30 |
| TPP | 45 | 45 | 46 | 46 |
| SL | 8 | 8 | 7 | 7 |
| SS | 7 | 7 | 6 | 6 |

Water was added to the same formulations at a rate of 1% with respect to the formula thus giving formulas A', B', C', and D'.

The eight formulations were then subject to an accelerated storage test carried out in the following manner:

150 g of homogenized mixture were placed into a reactor of 250 ml capacity with a flat bottom, equipped with an ascending condenser and an agitation device. The agitated mixture was brought to 65° C. and maintained at this temperature for a duration of 8 hours. At regular intervals, the active oxygen was determined.

The results obtained are the following: in the formulas A, B, C, and D the active oxygen is still present at 100%, whereas it has totally disappeared after several minutes at a temperature plateau of 65° C. in formulas A', B', C', and D'.

EXAMPLE 5

(Comparative)

The following formulation E was prepared:

| Formulation | E (Ex. 5) |
| --- | --- |
| $S_1$ | 11 |
| $S_2$ | 0 |
| Secondary Butanol | 20.7 |
| Na percarbonate | 9.3 |
| TPP | 46 |
| SL | 7 |
| SS | 6 |

Formulation E contains the same active oxygen content as does formulation C, but in form of sodium percarbonate instead of hydrogen peroxide.

Formulation C turns out to be of as high a performing quality as does formulation E, while at the same time presenting the advantage of not uselessly comprising a hydrogen peroxide "carrier" such as the sodium carbonate in the sodium percarbonate.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A storage stable anhydrous fluid detergent formulation with bleaching action for textiles comprising an anhydrous liquid phase and an anhydrous solid phase; the liquid phase comprising anhydrous hydrogen peroxide and said solid phase suspended in said liquid phase.

2. The formulation of claim 1 wherein said anhydrous hydrogen peroxide is in the form of a solution in an anhydrous organic solvent selected from primary, secondary, or tertiary alcohols or polyethers derived from ethylene glycol or propylene glycol.

3. The process for the preparation of the formulations of claim 1, comprising forming an anhydrous hydrogen peroxide liquid phase and admixing therewith; to form a suspension in said liquid phase, known solid anhydrous ingredients to give detergency.

4. The process of claim 3 wherein the hydrogen peroxide is used in the form of an anhydrous solution in an organic solvent selected from primary, secondary, or tertiary alcohols or polyethers derived from ethylene glycol or propylene glycol.

* * * * *